INVENTORS
RICHARD W. CARMAN
EARL E. MASTERSON
John J. McCormack ATTORNEY

Oct. 31, 1967 E. E. MASTERSON ET AL 3,350,091

RECORD TRANSPORT DEVICE

Filed July 9 1965 2 Sheets-Sheet 2

INVENTORS
RICHARD W. CARMAN
EARL E. MASTERSON

John J. McCormack ATTORNEY 3,350,091
Patented Oct. 31, 1967

3,350,091

RECORD TRANSPORT DEVICE

Earl E. Masterson, Newtonville, and Richard W. Carman, Foxboro, Mass., assignors to Honeywell Inc., Minneapolis, Minn., a corporation of Delaware Filed July 9, 1965, Ser. No. 470,756
9 Claims. (Cl. 271—52)

ABSTRACT OF THE DISCLOSURE

An advance roller arrangement for continually advancing record webs and generally including a pair of fixed, constantly rotated axles disposed above and below a prescribed segment along a record path, each axle including symmetrically spaced (across the web) pairs of identical resilient discs adapted to cooperatively and drivingly engage an intermediate record web at the segment, these discs being relatively rigid along their circumference, for somewhat rigid driving thrust, while being resilient in both the radial and transverse (lateral) directions, this lateral resiliency accommodating sidewise motion of the record material, such as during alignment contemporaneous with advancement. A reference guide rail is provided on one side of this segment and resilient aligning spring means disposed on the opposite side to urge a prescribed record width aligningly against this rail during roller advancement.

Figure 1:
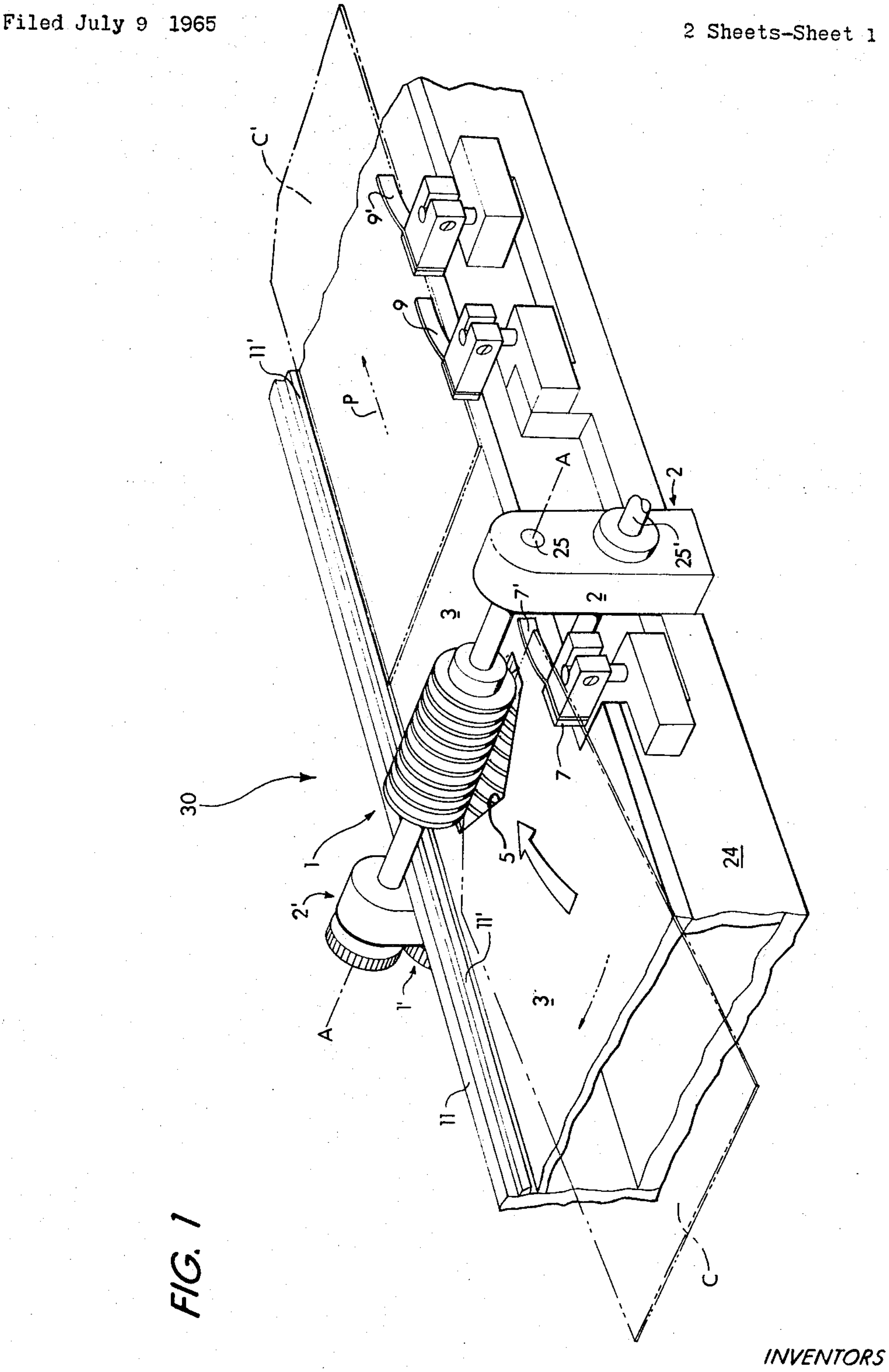

The present invention relates to improved translating and aligning mechanism for unit records associated with computers and more particularly to an improved mechanism providing means for driving unit records uninterruptedly along a prescribed "thrust direction" so that transverse aligning forces, urging the records transverse to the "thrust direction," may be simultaneously provided without either force undesirably affecting the other.

In the data processing arts, the problem of handling unit records, such as punched cards and the like, often involves the two-fold contemporaneous functions of record translation, for instance, through a data processing station( such as a card punch), and record alignment, for instance, so that holes may be punched at precise, encoded locations on the card. The prior art has addressed this problem in various ways. For example, some prior art systems provide separate alignment stations and transport means whereby a unit record is separately aligned, either before or after engagement with the transport means. Such an arrangement is unsatisfactory for several reasons. It is inferior to arrangements which simultaneously translate and align since it requires more intramachine space and makes the transport path longer, thus extending "record-throughput" time—a critical disadvantage. A separate alignment station also prevents the translation of records at a constant speed, this speed preferably being independent of the degree of required alignment. For instance, since pauses of varying intervals are required for varying degrees of alignment, independent alignment means can change inter-record spacing and few applications can tolerate this. Hence, workers in the art have been avidly searching for satisfactory systems to simultaneously translate and align unit records at one station. The present invention provides such a system having new and improved features exhibiting a desirable simplicity and reliability.

Some workers in the art have suggested schemes for simultaneously translating and aligning computer records by mechanisms which employ translating rollers which are controlled to drive records skewingly, that is in two components of motion; namely along the usual thrust direction and also transverse thereto so as to continuously thrust documents against a registration edge for alignment during translation. Such a bi-directional translation means is undesirable in the data processing arts for several reasons. A system which must perform these bi-directional urgings is necessarily more complex and less reliable than well known uni-directional translation means. Further, the operation of such an arrangement is undesirably and obviously slower than a uni-directional system since a portion of the driving energy is appropriated for transverse alignment. More importantly, however, such bi-directional arrangements continually stress each and every document, shoving it against a registration edge during translation whether it needs alignment or not. Such stress is very apt to tear and otherwise mutilate fragile documents such as checks. Additionally, such a bi-directional mode of operation is much more prone to abrade and wear rollers since they are much more likely to scuff and skid across the engaged surfaces. The present invention is directed toward combination translation and alignment mechanisms which are uni-directional and avoid the above-mentioned problems. More particularly, the invention is directed towards laterally-compliant translation means which operate to uni-directionally drive records in a first direction, together with separate alignment means for transversely thrusting the records into alignment, this alignment thrust being permitted by the compliant translation means. More particularly, the invention provides such a translation-alignment arrangement for translating documents faster using simpler components and with less record-stress and damage than prior art mechanisms.

Another drawback inherent in prior art translating and alignment system is that the translation element thereof are characteristically rigid and present the dilemma of achieving good record engagement only at the expense of alignment efficiency. That is, in an arrangement using separate rigid means to thrust and align records, one must constantly balance the advantages of good translation engagement, resulting from high translation pressure, against the desirability of low alignment forces which necessarily are resisted more as translation pressures go up. The invention presents a non-rigid laterally compliant translation means avoiding this dilemma.

A related problem is that of normal compliance in translation means. That is, in imposing such normal depressing forces, to engage the translation with the record, one must provide for some resiliency in the normal direction and thus employ relatively delicate, complex, adjustable spring means with translators which are normally-rigid. Such resiliency is obviously necessary to accommodate varying thicknesses of documents, as well as to allow for the inherent bounce and vibration of the translator during high-speed operation, without losing contact with the record for smooth continuous translations. Additionally, of course, considerable vibrational wear is experienced by such translators and associated spring means. Obviously, arrangements which require these springs are subject to changing performance and resultant changing record engagement continuously loading to erratic feeding motions rather than the desired smooth, constant-velocity motion. The present invention resolves the above problems by providing a normally-compliant mechanism for simultaneously performing the functions of driving and aligning a document. The invention allows large normal pressures on a record for positive engagement with the translation means without requiring high aligning forces. The invention also avoids the above-mentioned spring means and provides translation rollers which are normally resilient of themselves. More particularly, the drive means according to the invention may be depressed upon records to translate them in a constant manner while, because of its lateral compliance, it thereby presents no significant increase in drag to oppose aligning forces. Also, because of the inherent (normal) radial resiliency of the driving means according to the invention, bounce and vibration is damped out, documents of varying thicknesses are accommodated and roller-fatigue is minimized without the need for spring means.

Some prior art unit record translation means proposed to solve the above-mentioned problems have themselves presented a problem in being relatively nonrigid along the translation direction and thus unable to provide the smooth constant thrust desired. For instance, certain record translating rollers have lacked tangential rigidity and thus vary their translating thrust according to the resistance presented by a record. The present invention provides a combination record translating-aligning means which besides possessing the aforementioned advantages additionally provides translating roller means which are relatively rigid tangentially.

The aforegoing object and novel features of the invention are provided in a preferred embodiment of the invention which comprises a combined document translating and aligning arrangement including transport roller means which are relatively flexible and compliant along both of the normals (i.e., lateral and vertical) thereto. That is, the invention provides cylindrical roller means which are relatively rigid tangentially while being relatively flexible in the radial and axial directions. The invention particularly contemplates the employment of two cooperating multi-disc roller means, the discs thereof being of elastomeric material and preferably spaced so that the bite therebetween can resiliently accept documents of varying thicknesses to translate them simultaneously, accommodating the thrust thereof in a transverse lateral direction for alignment against a registration-rail by aligning flexure means.

The foregoing and other characteristic objects and features of novelty are pointed out with particularity in the claims annexed hereto and form a part of the present specification. For a better understanding of the invention, its advantages and specific objects attained with its use, references should be had to the accompanying drawings and descriptive matter wherein is illustrated and described the preferred embodiment of the invention.

Figure 2:
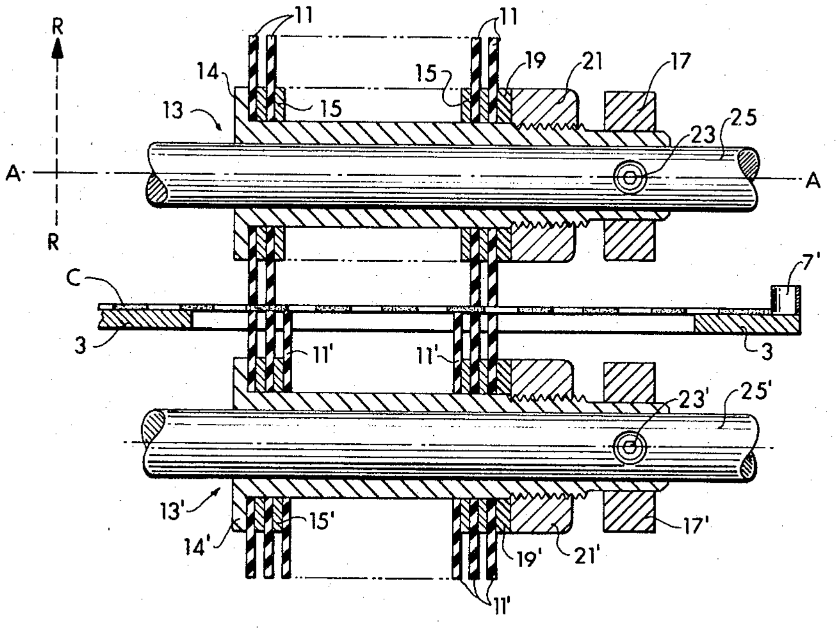

Referring to the drawings wherein like reference numerals denote like parts:

FIGURE 1 shows a perspective view of a preferred embodiment of the invention as employed in a translation-alignment station comprising part of the transport path in a data processing apparatus; and FIGURE 2 is an enlarged side elevation of the disc-roller pairs shown in FIGURE 1.

FIGURE 1 shows a preferred embodiment of the invention in the form of a punched card translation-alignment station employed in connection with card-handling apparatus. Functionally, this embodiment represents an arrangement for simultaneously advancing and aligning unit-record media namely punched cards C, C′, along a transport path P at a pescribed speed and in prescribed alignment. This operation is schematically indicated by reference to punched cards C, C′, shown as respectively entering and leaving a translation-alignment station 30. Thus, punched card C represents an "input card" which has been presented to translating roller arrangement 1, 1′, in an oblique, slightly skewed or misaligned attitude, that is, the long axis of card C is oblique to the transport direction P and card C is offset slightly out of contact with rail 11. Output card C′ represents the prescribed aligned attitude that card C will be caused to assume while being translated by rollers 1, 1′.

In particular, the translation-alignment station 30 preferably comprises a pair of cooperating disc rollers 1, 1′, a base plate 3 for directing documents into the bite of rollers 1, 1′ and therebeyond when thrust therethrough, an alignment rail 11 and a plurality of resilient alignment-thrust means namely flexure springs 7, 9, 9′ for urging misaligned documents against rail 11. It will be understood that the transport surface, or base plate 3 is positioned to direct cards C etc. along a prescribed plane in the translation direction P, plate 3 having a slot 5 provided therethrough to accommodate the mating portions of cooperating drive rollers 1, 1′. The plane of plate 3 thus defines the bite between rollers 1, 1′. Guide rail 11 is carried by plate 3, being affixed rigidly thereon to project from one side thereof so as to provide a "registration edge" against which cards C, etc., may be aligned, this edge being parallel with translation path P. It will be apparent that base plate 3 may comprise any smooth, flat, rigid surface across which cards C, C′ etc. may be skidded with minimum frictional drag. Similarly, guide rail 11 should comprise a smooth, low-drag registration surface along which cards C, C′ etc. may be drawn with a minimum of friction, and where necessary, may also include a low-friction covering, such as a movable Mylar ribbon or the like. Additionally, rail 11 preferably includes an overhang portion 11′ for vertically guiding cards C, etc., during alignment and preventing the upward folding or skewing, etc., thereof.

Cooperating with registration rail 11, alignment spring 7, 9, 9′ are arranged to resiliently thrust cards C etc. against rail 11, preferably being arranged to impose a light, barely perceptible thrust on card-edges which are in alignment, i.e., which are spaced a prescribed "normal-card-width" from rail 11 as with card C′. It is a feature of the invention that springs 7, 9, 9′ thus need not place any significant lateral stress upon cards which are "properly" aligned and therefore do not unnecessarily stress cards, buckling, bending, or scratching them, etc. Alignment springs 9, 9′, 7 preferably comprise thin flexures, for instance, of thin spring steel, mounted rigidly to project from plate 3 as shown in FIGURE 2 to engage card-edges depressingly, preferably below their vertical center, to avoid lifting them from plate 3. As shown, springs 7, 9, 9′ are preferably curved in the transport direction P to provide a smooth gradual, continuous engagement with misaligned cards, such as card C, adjacent to the outer tip (e.g., tip 7′) thereof. For instance, tip 7′ will lightly thrust a properly aligned card, while strongly thrusting a skewed card. For the illustrated arrangement, it was found that an "aligned card" would normally deflect the spring about 1⁄64 inch while "ordinarily misaligned" cards could deflect it up to about 3⁄64 inch. Thus, keeping spring contact with aligned cards assures that cards which may be slightly narrower than prescribed may be also thrust aligningly against rail 11. It is preferred that the initial spring means 7 engages the cards only while they are engaged by rollers 1, 1′, since prior or later engaging thrusts may tend to pivot the cards and cause undesirable "fishtailing." Thus, spring 7 is preferably disposed to engage card-edges at the bite axis (spring-tip 7′ along axis A—A) to translate them aligningly without disturbing their motion along transport direction P, i.e. without turning or pivoting them. Downstream springs 9, 9′ on the other hand are merely provided to maintain alignment against rail 11.

As seen in FIGURE 2, base 3 is reduced in width about the roller bite (axis A—A) so as to be narrower than the width of the narrowest record. This will allow spring 7 to engage cards C similarly despite differences in width and align them whether their engaging edge is at the normal position or on either side thereof, for instance allowing alignment of "under-width" cards. Disposing the springs on both sides of rollers 1, 1′ (e.g., as with 7 and 9) allows contemporaneous alignment action during translation by rollers 1, 1′.

Springs 7, 9, 9′ may thus comprise any laterally flexible means, according to the invention, which provide a relatively small lateral force along the plane of plate 3 toward guide rail 11. This force will depend to some extent upon the lateral compliance of the disc elements of rollers 1, 1′, the weight of the thrust cards, card speed and the like. While springs 9, 9′ might in some cases, be dispensed with, it will be apparent that they will normally be desired, and where advantageous, other similar springs may be added. Thus, according to this feature of the invention, springs 7, 9, 9′ in cooperation with laterally compliant rollers 1, 1′, need provide little or no lateral aligning stresses upon aligned cards and not unnecessarily stress and scuff them; being lightly urged across base plate 3 against guide rail 11 by springs 7, 9, 9′, all of which function as a card-directing and aligning means cooperatively associated with driving disc-rollers 1, 1′.

An important feature of the invention is that translation rollers 1, 1′ are arranged to be radially and axially resilient while being tangentially (i.e., in direction P) rigid. Rollers 1, 1′ comprise relatively identical upper and lower sets of resilient disc members 11, 11′ (see FIGURE 2 especially). Discs 11, 11′ are fabricated to be relatively rigid when presented to tangential forces (along direction P) but to be relatively resilient and flexible along the radial and axial dimensions thereof, that is along axes R—R and A—A, respectively. Discs 11, 11′ are affixed upon axles 25, 25′ respectively to be rotated synchronously so as to thrust cards C, C′, etc., along direction P. Discs 11, 11′ are regularly spaced, preferably equi-distantly, along axles 25, 25′ by identical washers 15, 15′ respectively to be in opposed relation to punched cards C, C′ cooperatively above and below. Opposing discs 11, 11′ will be preferably spaced apart (on axles 25, 25′) to define an inter-roller "bite" of less than a card-thickness, preferably almost touching to provide positive non-slipping driving card-engagement when axles 25, 25′ are rotated. The number of discs 11, 11′ on axles 25, 25′ should be relatively identical and comprise only enough to yield the required card thrust (acceleration) and will depend, of course, upon record-thickness (cards are normally about 0.007″ thick); the speed of axles 25, 25′; the resilience of discs 11, 11′ and their coefficient of engaging friction with the record surfaces, etc. About 15 discs of about 1/32″ thickness have been found suitable for each axle. The coefficient of card-disc friction should, of course, be very much higher than card-plate friction, base plate 3 being as smooth as possible for efficient transport.

Discs 11, 11′ are thus formed of resilient, preferably elastomeric materials, such as rubber, plastic etc., having the required resilience and frictional properties. Discs of neoprene with a diameter of about 1 inch having a central axle-engaging bore have been found suitable. Preferably, the disc elastomer has relatively fast elastic recovery; thus, rubber with about 50–60 durometer is preferred, given driving speeds of about 125 in./sec. (the latter affecting stiffness, of course).

It is preferred to employ a pair of disc-rollers 1, 1′, as opposed to only an upper roller 1, since lower disc-roller 1′ provides a vertically compliant "bite" with upper roller 1 but offers little or no lateral resistance to lateral (aligning) card motion, being laterally (axially) resilient. In certain cases lower disc roller 1′ might be replaced with a drum roller having a very-low friction surface, such as nylon, Teflon, or the like.

Roller axles 25, 25′ are kept parallel being journaled between a pair of brackets 2, 2′ affixed to a stationary frame portion 24 in common with plate 3. Axles 25, 25′ are adapted to be driven by means (not shown) known to those skilled in the art, such as a pulley-belt arrangement, which will rotate them both at the same high speed in synchronism to avoid record-shearing stresses. Discs 11, 11′ are affixed along the length of axles 25, 25′ being coupled thereto by a pair of sleeves 13, 13′ respectively. Sleeves 13, 13′ are detachably affixed to rotatable axles 25, 25′ to be driven therewith, such as by a pair of collars 17, 17′ and associated set screws 23, 23′. As shown, screws 23, 23′ are threadably engaged through registering threaded bores through sleeves 13, 13′ and surrounding sleeve collars 17, 17′ to engage flats on shafts 25, 25′ in a well-known manner. Discs 11, 11′ may be affixed upon cylindrical sleeves 13, 13′ in any well-known manner, although it has been found especially convenient to provide a central reduced portion on sleeves 13, 13′ having flats thereon and providing a registering bore in discs 11, 11′ to thread the discs thereon. Where discs 11, 11′ are fixedly engaged by sleeves 13, 13′ respectively, washers 15, 15′ are rotatably threaded thereon. Washers 15, 15′ may be of the same thickness as discs 11, 11′, each disc-washer set being clamped along sleeve 13, 13′ respectively between terminal collar portions 14, 14′ thereof and clamping nut/washer couplings 21–19, 21′–19′ respectively. This array of alternate discs and washers may be extended for any convenient length disposed relatively symmetrically across a card-width along sleeves 13. 13′. Hex nuts 21, 21′ and cooperating sleeve washers 19, 19′ engage threaded portions of sleeves 13, 13′ in a well-known manner or comprise equivalent detachable-attachment means. Thus, discs 11, 11′ are clamped to be positively located on sleeves 13, 13′ without being torsionally stressed by the clamp-coupling.

It is a feature of the invention that no depressing springs are necessary to engage driven records (direction of radial axis R—R) due to the inherent radial (vertical) resilience of discs 11, 11′ and their relative record-clamping disposition.

Another feature is that discs 11, 11′ provide a record-advancing arrangement which is laterally compliant, to accommodate lateral aligning record-translations during record-advancement, with niether force interfering with the other. It will be observed that another feature of the translation arrangement 1, 1′ of the invention is that it is lighter than solid rollers, having less roller-inertia for easier and faster starting and stopping accelerations. The resilient, laterally-flexible discs also allow reduced aligning forces and reduce card-to-roller scuffing to insignificance since rather than resisting the aligning movements of cards and abrading them, they simply flex (internally) to "follow" such lateral movement. Furthermore, if a record is already aligned, there is no perceptible unnecessary aligning stress imposed by the described arrangement.

Besides being radially and axially resilient, discs 11′ are, according to another feature of the invention, nonetheless relatively rigid in a tangential, or circumferential, direction (along direction P). This provides positive, constant, advancing record-thrust. This lateral and radial flexibility along with the tangential rigidity of course depends to some extent upon the thickness of the material, which may at times be very thin in the case of tissue-like checks, receipts and the like.

Although it is believed the operation of the described translation-alignment arrangement will be evident to those skilled in the art from the above description, for the purposes of clarity, it may be summarized and amplified, as follows: Upon the introduction of a card (such as card C) which is somewhat misaligned into the bite between the rubber discs 11, 11′ of continuously rotating rollers 1, 1′, it will be evident that one edge of such a card C will be engaged smoothly by the tip 7′ of aligning spring 7. Tip 7′ will then proceed to urge card C gently against registration rail 11 as long as it is still misaligned while it is being translated in direction P by the rotating, roller discs 11, 11'. Since discs 11, 11' are radially-resilient, they will yield enough to admit the card width and thus positively engage it with a slight normal pressure which, together with the high coefficient of friction between the discs 11, 11' and the card surface, will cause card C to be uni-directionally and positively advanced along path P in a smooth, uninterrupted motion at the linear velocity of the disc peripheries. During this advancement, along direction P, the lateral aligning stress imparted by spring 7 will be transmitted by misaligned card C to the roller discs 11, 11' which will offer little resistance, yielding deformably (along axis A) in response, to thus allow card C to be simultaneously translated toward rail 11 while being advanced, yet without scraping it. It will be apparent that spring 7 and, if necessary, following springs 9, 9' may continue to urge card C into alignment against rail 11, while it is being advanced, until it is aligned properly, as is card (C). It will also be apparent that if card C had been already "aligned" when introduced between rollers 1, 1', the aligning springs 7, 9, 9' will impose little lateral stresses thereon.

It will be apparent to those skilled in the art that equivalent means may be used within the spirit and scope of the inventive teaching. That is, while the invention has been particularly shown and described with reference to the preferred embodiment thereof above, it will be understood by those skilled in the art that changes in form and details, in materials and dimensions and the like may be made, certain features being substituted for or deleted without departing from the spirit or scope of the invention.

What is claimed is:

1. Unit record advancing means comprising at least one disc-roller means disposed to advance unit records uni-directionally along a prescribed path and also engaging means disposed opposite said roller means so as to jointly engage intermediate records for advancement thereof, being laterally compliant to allow record shifting transverse to said path, said disc-roller means comprising at least one resilient disc means mounted on a shaft means to be driven rotatably thereby, said disc means being disposed to positively and resiliently engage said records while being sufficiently compliant to permit the thrust thereof transverse to said path for alignment during the advancement thereof.

2. The combination recited in claim 1 wherein said disc roller means comprises a pair of disc arrays, each array comprising a plurality of resilient discs mounted upon a rotatable shaft to be rotated thereby, said disc members being spaced along their respective shafts and spaced apart in opposing relation so as to establish a resilient bite therebetween.

3. The combination recited in claim 2 wherein said disc members are comprised of elastomeric material having a thickness adapted to permit at least a prescribed minimum of radial and axial resiliency.

4. Apparatus for independent aligning and advancing of documents along a document channel from an input location to an output location thereof, said channel including a floor and a side member, said side member being disposed to align an edge of said documents along a prescribed path, the combination therewith of:

Advancing means mounted along said channel between said locations and including resilient disc means disposed to be rotated at a prescribed, constant velocity to advance said documents along said path uni-directionally, said disc means comprising a plurality of resilient discs, said discs being comprised of elastomeric material which is tangentially relatively rigid so as to thrust said documents along said path unyieldingly, while being relatively resilient along radial and axial dimensions thereof, said advancing means also including low friction, laterally yieldable base means disposed along said path relatively along said floor and being in opposed, record-engaging relation with said discs so as to form therewith a record-engaging nip and being laterally compliant to yield along with said discs to record shifting so that a record may be aligned while being advanced. and aligning means for thrusting said documents along the plane of said floor toward said side, said aligning means being disposed to provide an aligning thrust during the advancement of said documents without substantially affecting the rate or direction of document advancement.

5. An improved mechanism for advancing unit records in prescribed ailgnment along a path, said mechanism comprising: a uni-directional drive arrangement including opposed pairs of resilient disc means arranged to be rotated so as to positively and continuously drive said records along said path, said disc means being formed to be relatively resilient along two normals to said path, one normal being in the record plane, the other normal thereto, each disc means being arranged to exhibit sufficient lateral resilience to accommodate thrustings of said records, driven thereby, in a lateral direction, transverse to said path, and each said disc means also being arranged to function independently.

6. Apparatus as recited in claim 5 wherein said drive arrangement comprises a pair of parallel drive shafts adapted to be rotated synchronously in opposite directions and at least one pair of elastomeric disc members, mounted on said shafts in opposed space relation so as to establish a resilient bite for positive driving engagement of documents therebetween, said disc members being relatively rigid tangentially while being relatively resilient all along their radial and axial dimensions.

7. In a unit record transport combination comprising part of a record processing apparatus, the combination therewith a record advancing and aligning means comprising:

Record-supporting surface means disposed to receive said records being advanced along a prescribed path; guide rail means affixed relative to said surface means to direct said records in prescribed alignment along said path thereacross; aligning means disposed adjacent a portion of said surface means and adjacent a prescribed segment of said path, being adapted to urge records into registration against said rail means; and disc-roller means disposed adjacent said portion of said surface means along said path segment so as to positively engage said records to thrust them uni-directionally along said path, said disc-roller means comprising: a plurality of resilient discs affixed upon a rotatable shaft means and disposed to be driven rotatably thereby, said disc and shaft means being arranged to positively engage said records as they are introduced across said portion of said surface and to rigidly thrust them along said path; said disc means being sufficiently compliant to permit resilient engagement with said records as well as to accommodate lateral aligning shifts thereof transverse to said path direction by said aligning means during their advancement; said disc-roller means also including low friction, laterally-compliant base means located along said path relatively adjacent said surface means and in opposed record-engaging cooperative relation with said disc means so as to form therewith a record-engaging nip while being concomitantly compliant to said transverse record shifting.

8. The combination as recited in claim 7 wherein said roller means comprises a pair of record-squeezing resilient disc arrays, each array comprising a plurality of resilient discs mounted upon a rotatable shaft to be continually rotated thereby, said disc members being spaced along their respective shafts and attached thereto within an array, said arrays of discs being opposingly spaced somewhat less than a record thickness so as to establish a resilient, yielding bite therebetween, each of said discs being comprised of elastomeric material of a thickness adapted to permit at least a prescribed minimum of radial and axial resiliency.

9. The combination as recited in claim 8 wherein said aligning engagement against said rail means, said align-engaging spring members disposed along said path segment and biased to urge records of a particular width into aligning engagement against said rail means, said aligning force being proportional to the degree of misalignment of an engaged edge from a nominal reference position.

References Cited

UNITED STATES PATENTS

| | | | |
|---|---|---|---|
| 2,300,625 | 11/1942 | Martin | 271—49 |
| 2,673,168 | 3/1954 | Pascoe et al. | 271—51 X |
| 3,001,787 | 9/1961 | Socke | 271—49 |
| 3,084,931 | 4/1963 | Hanson | 271—59 |
| 3,148,877 | 9/1964 | Brearley | 271—59 X |
| 3,229,608 | 1/1966 | Staub et al. | 271—51 X |

ALLEN N. KNOWLES, *Primary Examiner.*

UNITED STATES PATENT OFFICE

CERTIFICATE OF CORRECTION

?atent No. 3,350,091 October 31, 1967

Earl E. Masterson et al.

It is certified that error appears in the above identified patent and that said Letters Patent are hereby corrected as shown below:

Column 1, line 14, "fixed, constantly" should read -- fixed constantly --. Column 7, line 40, "path, said" should read -- path; said --. Column 9, line 5, cancel "aligning engagement against said rail means, said align-" and insert -- alignment means comprises a plurality of flat record-edge- --.

Signed and sealed this 17th day of March 1970.

SEAL)

Attest:

Edward M. Fletcher, Jr.
Attesting Officer

WILLIAM E. SCHUYLER, JR.
Commissioner of Patents